W. H. Hall,
Horseshoe.
No. 54,335. Patented May 1, 1866.
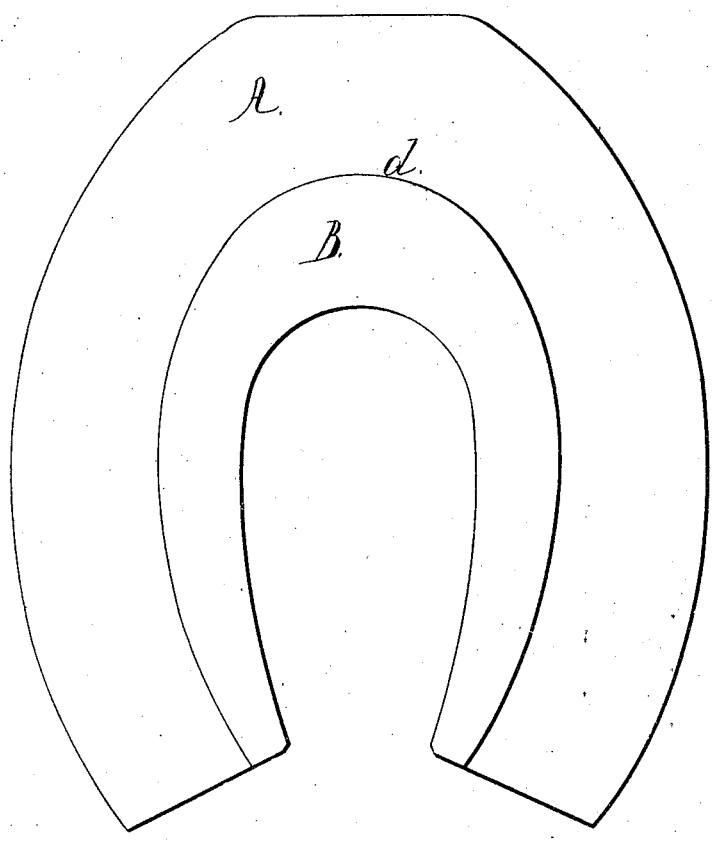
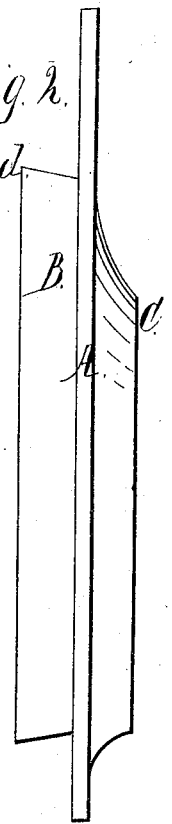

UNITED STATES PATENT OFFICE.

WILLIAM H. HALL, OF NEW GLOUCESTER, MAINE.

IMPROVED ELASTIC CUSHION AND GUARD FOR THE FEET OF HORSES.

Specification forming part of Letters Patent No. 54,335, dated May 1, 1866.

*To all whom it may concern:*

Be it known that I, WILLIAM H. HALL, of New Gloucester, in the county of Cumberland and State of Maine, have invented a new and useful Elastic Cushion and Guard for the Feet of Horses; and I do hereby declare the following to be a full, clear, and exact description thereof, which will enable others to make and use my invention, reference being made to the accompanying drawings, forming part of this specification, in which—

Figure 1 shows a view of the lower side of my invention. Fig. 2 shows the two projections B and C.

The object of my invention is to produce an elastic cushion and guard to be secured and worn between the shoe and hoofs of horses, for the purpose of protecting the hoofs, and of preventing "balling up" of the feet by snow and ice in the winter season.

My invention consists of an elastic inner shoe cut or cast into a shape conforming to the horse's hoof, and having upon either side a projection of the shapes and for the purposes hereinafter described.

In Fig. 1, A shows that portion of my invention that is intended to be held between the shoe of the animal and the hoof. B, Figs. 1 and 2, shows a projection designed to fit around on the edges of the inner curve of an ordinary horseshoe. This is so made as to extend a little beyond the lower side of the shoe, and to present some surface between the inner edge of the shoe and that of the cushion, as illustrated in Fig. 1.

*d* shows the edge of this projection, which comes in contact with the inner curve of the horseshoe. The object of this is to prevent the accumulation of snow and ice in the hollow of the animal's foot. The use in this place of an elastic substance, like rubber, &c., effectually prevents such accumulation, and enables the animal to travel with ease and without pain and liability to injury over moist or partly-melted ice and snow.

C indicates a projection upon the other side of the inner shoe, A, which conforms to the shape of the bottom of the hoof and enables the cushion to be accurately fitted thereto. The cushion is secured to the hoof at the same time with the common iron shoe and by the same means.

Elasticity is imparted to the step of the animal by the use of the inner shoe or cushion, A, and it, moreover, serves for a protection to the hoof by preventing the immediate contact of the iron of the shoe therewith.

My invention can be used to advantage upon horses having tender or imperfect feet, as it lessens the liability to fracture and relieves the pain of working upon a hard or rocky ground or upon a pavement.

I construct my improved cushion and guard either by cutting from a piece of rubber or gutta-percha the inner shoe having the projections B and C, as described, or by making molds and casting the same.

I do not contemplate or claim the use of any other materials except those above named.

In a case where the animal interferes, injury to one leg by the shoe and hoof of another can be prevented by so constructing the part A that it will project somewhat beyond the hoof and shoe, and thus protect the legs from abrasion by the contact and blows of the hoof and shoe.

What I claim as my invention, and desire to secure by Letters Patent, is—

The use of the elastic inner shoe and guard, when cut or cast into the form herein described, for the purposes set forth.

WILLIAM H. HALL.

Witnesses:
WILLIAM H. CLIFFORD,
HENRY MILLER.